(12) United States Patent
Jia et al.

(10) Patent No.: US 10,912,148 B2
(45) Date of Patent: *Feb. 2, 2021

(54) SYSTEM AND METHOD FOR UE FOUNTAIN RELAY BASED NETWORK

(71) Applicant: Huawei Technologies Co., Ltd., Shenzhen (CN)

(72) Inventors: Ming Jia, Ottawa (CA); Jianglei Ma, Ottawa (CA); Peiying Zhu, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,894

(22) Filed: Oct. 29, 2018

(65) Prior Publication Data

US 2019/0069341 A1 Feb. 28, 2019

Related U.S. Application Data

(63) Continuation of application No. 13/797,371, filed on Mar. 12, 2013, now Pat. No. 10,129,928.

(60) Provisional application No. 61/737,592, filed on Dec. 14, 2012.

(51) Int. Cl.
  *H04W 88/04* (2009.01)
  *H04L 1/00* (2006.01)
  *H04L 1/18* (2006.01)

(52) U.S. Cl.
  CPC .......... *H04W 88/04* (2013.01); *H04L 1/0041* (2013.01); *H04L 1/1819* (2013.01); *H04L 2001/0097* (2013.01)

(58) Field of Classification Search
  CPC . H04L 2001/0097; H04L 1/00; H04L 1/0041; H04W 88/04
  See application file for complete search history.

(56) References Cited

U.S. PATENT DOCUMENTS

| 7,924,761 | B1 | 4/2011 | Stevens |
| 8,238,812 | B2 | 8/2012 | Kim et al. |

(Continued)

FOREIGN PATENT DOCUMENTS

| CN | 101969668 A | 2/2011 |
| CN | 101667904 A | 3/2012 |
| CN | 102694636 A | 9/2012 |

OTHER PUBLICATIONS

Castura et al., "Rateless Coding for Wireless Relay Channels," IEEE Trans. Wireless Commun. vol. 6, No. 5, pp. 1638-1642, May 2007.

(Continued)

*Primary Examiner* — Kent Krueger
(74) *Attorney, Agent, or Firm* — Slater Matsil, LLP

(57) ABSTRACT

System and method embodiments are provided for enabling flexible and reliable UE-to-UE based relay. The embodiments include using fountain codes for combining signals at a suitable network layer higher than a media access control (MAC) sub-layer and using a MAC sub-layer hybrid automatic repeat request (HARQ) transmission scheme. When a relay UE in a UE group for joint reception receives, from a network access point, a data packet intended for a destination UE in the UE group and including fountain code at the higher network layer, the relay UE sends the data packet to the destination UE and returns a HARQ ACK message at the MAC sub-layer to the access point. The destination UE then receives and decodes the data packet. Subsequently, upon receiving the entire data, the destination UE sends an ACK message at the higher network layer to the access point.

18 Claims, 3 Drawing Sheets

(56) References Cited

U.S. PATENT DOCUMENTS

| | | |
|---|---|---|
| 2007/0280233 A1 | 12/2007 | Bush |
| 2009/0175214 A1 | 7/2009 | Sfar et al. |
| 2010/0054137 A1* | 3/2010 | Deng ................ H04B 7/15592 |
| | | 370/247 |
| 2010/0296432 A1 | 11/2010 | Mehta et al. |
| 2012/0188934 A1 | 7/2012 | Liu et al. |
| 2013/0089020 A1 | 4/2013 | Hakola et al. |
| 2014/0112158 A1 | 4/2014 | Tavildar et al. |

OTHER PUBLICATIONS

Fragouli, C., et al., "Wireless Network Coding: Opportunities & Challenges," IEEE Military Communications Conference, Oct. 29-31, 2007. pp. 1-8.

Larmo et al., "The LTE Link-Layer Design," IEEE Commun., LTE Part II: 3GPP Release 8, Mag., vol. 47, No. 4, pp. 52-59, Apr. 2009.

Liu et al., "Fountain codes over Fading Relay Channels", IEEE Trans. on Wireless Commun. vol. 8, No. 6, 10 pages, Jun. 2009.

Luby et al., "Mobile Data Broadcasting over MBMS Tradeoffs in Forward Error Correction," the 5th International Conference on Mobile and Ubiquitous Multimedia, Stanford, CA, USA, Dec. 4-6, 2006, 8 pages.

Shokrollahi, "Raptor Codes," IEEE Trans. Inf. Theory, vol. 52, No. 6, pp. 2551-2567, Jun. 2006.

Talbot, D., "A Bandwidth Breakthrough; A dash of algegra on wireless networks promises to boost bandwidth tenfold, without infrastructure." MIT Technology Review, Oct. 23, 2012, 3 pages.

Xiaowei, J., "Research on the Relay and M2M Random Access Technology of LTE-Advanced," Huazhong University of Science and Technology, 2012, 69 pages (with partial translation).

* cited by examiner

SYSTEM AND METHOD FOR UE FOUNTAIN RELAY BASED NETWORK

This application is a continuation of U.S. patent application Ser. No. 13/797,371, filed on Mar. 12, 2013, entitled "System and Method for UE Fountain Relay Based Network," which claims benefit to U.S. Provisional Patent Application Ser. No. 61/737,592, filed on Dec. 14, 2012, and entitled "Fountain Relay System and Method," which applications are hereby incorporated by reference in their entireties.

TECHNICAL FIELD

The present invention relates to the field of wireless communications, and, in particular embodiments, to system and method for user equipment (U E) fountain relay based network.

BACKGROUND

Improvements in cellular systems include enhancing throughput and coverage. To address these two issues, one trend is to deploy low power nodes (LPNs) and/or relays nodes (RNs), for example in the framework of Heterogeneous Network (HetNet). To improve throughput and coverage, the LPNs transmit cellular or wireless signals directly to user equipments (UEs), while the RNs relay cellular or wireless signals between base stations and UEs to improve throughput and coverage. However, deploying more LPNs and RNs, e.g., by operators, increase capital and operational cost. Overall cost may include installation, backhaul, and maintenance costs. Another trend is to use communications between UEs, also referred to in some scenarios as device-to-device (D2D) communications, to establish joint UE reception, where some of the UEs act as relays for other UEs to improve system throughput and coverage. However, exchanging information among the UEs can require substantial amount of power and resource. Joint UE reception using D2D communications can also increase the complexity of the network, e.g., using additional signaling, to ensure the reliable reception of transmitted signals. There is a need for an efficient scheme to support joint UE reception with UE-to-UE based relay systems.

SUMMARY OF THE INVENTION

In one embodiment, a method for UE based relay for a wireless network includes receiving, at a relay UE, a data packet intended for a destination UE from an access point of the wireless network, the data packet including fountain code at a higher network layer than a media access control (MAC) sub-layer, returning a hybrid automatic repeat request (HARQ) acknowledgment (ACK) message at the MAC sub-layer to the access point, and sending the data packet to the destination UE.

In another embodiment, a method for supporting UE based relay for a wireless network includes receiving, at a destination UE, a data packet forwarded via a relay UE from an access point of the wireless network, the data packet includes data encoded with fountain code at a higher network layer than a MAC sub-layer, decoding the data, and sending an ACK message at the higher network layer to the access point upon receiving the entire data.

In another embodiment, a method for supporting UE based relay for a wireless network includes encoding, at a base station, data intended for a destination UE using fountain code at a higher network layer than a MAC sub-layer, sending a plurality of data packets including the encoded data to a UE group for joint reception including the destination UE, and receiving an ACK message at the higher network layer from the destination UE to indicate that the encoded data using fountain code is received successfully.

In another embodiment, a UE for UE based relay for a wireless network includes a processor and a computer readable storage medium storing programming for execution by the processor. The programming including instructions to receive a data packet intended for a destination UE from an access point of the wireless network, the data packet including fountain code at a higher network layer than a MAC sub-layer, return a HARQ ACK message at the MAC sub-layer to the access point, and send the data packet to the destination UE.

In another embodiment, a UE for supporting UE based relay for a wireless network includes a processor and a computer readable storage medium storing programming for execution by the processor. The programming including instructions to receive a data packet forwarded via a relay UE from an access point of the wireless network, the data packet includes data encoded with fountain code at a higher network layer than a MAC sub-layer, decode the data, and send an ACK message at the higher network layer to the access point upon receiving the entire data.

In yet another embodiment, a base station for supporting UE based relay for a wireless network includes a processor and a computer readable storage medium storing programming for execution by the processor. The programming including instructions to encode data intended for a destination UE using fountain code at a higher network layer than a MAC sub-layer, send a plurality of data packets including the encoded data to a UE group for joint reception including the destination UE, and receive an ACK message at the higher network layer from the destination UE to indicate that the encoded data using fountain code is received successfully.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are presented for providing flexible and reliable UE-to-UE based relay, which can improve a network performance in terms of throughput and coverage. The embodiments include using fountain codes to combine signals at any suitable layer higher than the media access control (MAC) sub-layer, such as an application layer. The embodiments also include improving base station to UE efficiency by using a MAC sub-layer hybrid automatic repeat request (HARQ) transmission scheme with the higher layer fountain codes. Using fountain codes at the higher layer allows a receiving UE to compensate for loss of data packets, such as due to residual HARQ errors, unsuccessful reception, or other reasons. Combining the higher layer fountain codes with the MAC sub-layer HARQ scheme also reduces the number of HARQ retransmissions and relaxes some requirements for handling UE relay communications, such as removing the need to receive and decode every packet for HARQ. This also reduces delay time of communications for the UE. The embodiments allow the joint optimization of the HARQ scheme at the MAC sub-layer with fountain codes at a higher layer, as described below.

Figure 1:
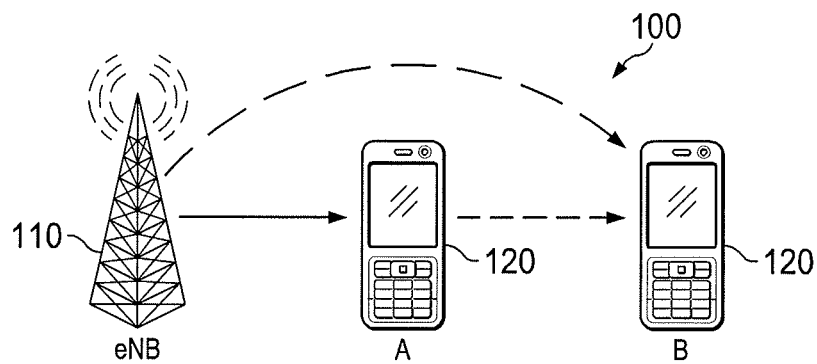
FIG. 1 illustrates a UE-to-UE relay based system.

FIG. 1 shows a UE-to-UE relay based system 100, including a base station 110, for example an evolved Node B (eNB), and a plurality of UEs 120. The base station 110 serves as an access point for the UEs 120 in a cellular network. Examples of UEs 120 include cellular telephones, smartphones, computer tablets, computer desktops, or other mobile or personal devices capable of establishing wireless communications. Using D2D communications, a UE 120 (UE-A) can serve as a relay between the base station 110 and a target UE 120 (UE-B), for example during the idle time of UE-A. The relay UE-A can receive and forward signals intended to the target UE-B from the base station 110 to the UE-B. The UE-A can also receive and forward signals from UE-B to the base station 110. The UE-A communicates with the base station or eNB 110 via an eNB to UE (or access) link and communicates with the UE-B via a UE-to-UE link (or a D2D link).

The UE-A may be used as a relay as such when the eNB (or access) link to UE-A is better (e.g., in terms of signal to noise ratio or other performance criteria) than the eNB link to UE-B. For example, the UE-A can communicate with UE-B and/or the base station 110 using one or more different frequency channels. Thus, relaying the signals between the base station or eNB 110 and UE-B may improve throughput and hence performance. The relay UE-A can also be used as a relay to extend the reach or coverage of the signals from the base station 110 to UE-B (for downlink) and similarly from UE-B to the base station 110 (for uplink). The gain in throughput and coverage may be determined by the capacity and reliability of the link from the base station or eNB 110 to the relay UE-A, as well as the efficiency and reliability of the link from the relay UE-A to the target UE-B. With a reliable UE relay based system, fewer LPNs and/or RNs are needed in the network, which reduces capital and operation cost.

Figure 2:
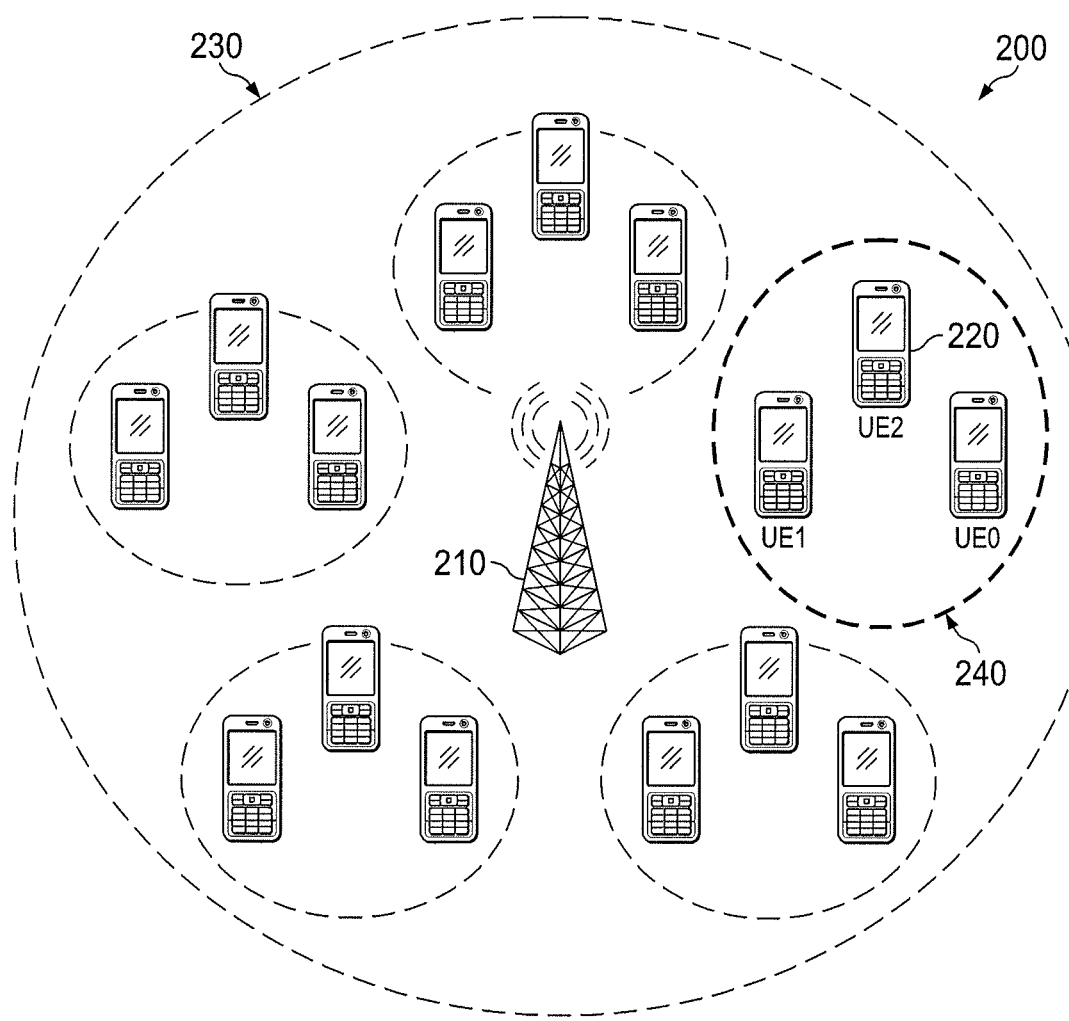
FIG. 2 illustrates a UE group based relay system.

FIG. 2 shows a UE group based relay system 200, including one or more base stations 210 (e.g., eNBs) and a plurality of UEs 220, which may be located within a coverage cell 230 of the base station 210. The UEs 220 may be arranged in different UE groups 240 for joint UE reception. The groups 240 may be established by an association process between the UEs 220 within a group 240, e.g., via D2D communications. In each group 240, one or more UEs 220 can serve as relays for other UEs 220. The relay UEs 220 can change over time, e.g., according to signal, location, UE, and/or network conditions. Further, UEs 220 can enter and exit different groups 240 over time. A UE 220 may also join more than one group 240 at the same time or may not be a member of any group 240.

A UE 220 is associated with several nearby UEs 220 to form a group 240. As such, the chance that all the UEs 220 within a group 240 experience signal down-fading at the same time is substantially low. Thus, at least one UE 220 in the group is likely to receive the signal or packet. The UE group based relay scheme also facilitates scheduling, e.g., without the need of frequency selective scheduling (FSS) by the base station 210. Further, the required Channel Quality Indicator (CQI) feedback may be substantially reduced, since due to UE selection diversity, the effective CQI (e.g., the best CQI in the group) is more stable. To reduce complexity, only UEs 220 that are not experiencing down-fading may operate as relays.

Additionally, to reduce signaling overhead and simplify system design, UE association (to form the groups 240) can be transparent to the system or network (e.g., transparent to the base station 210). The system reliability can be improved using UE group based reception and relay. For example, a destination or target UE 220 can select one relay UE 220, which has successfully received the data, to do the relay. A relay UE 220, also referred to as a helping UE, may operate as "decode-and-forward" on a best-effort basis. This means that if a relay UE 220 cannot successfully decode a received packet or signal, then the relay UE 220 does not forward that signal or packet to the target UE 220.

In an embodiment, fountain codes can be applied to communications between a UE and a base station of a wireless or cellular network. The fountain codes are rateless codes used to ensure that encoded data blocks or bit strings are entirely received by a UE. A data block or bit string can be encoded using fountain codes and transmitted over a plurality packets. For example, an original data block of 1000 bits can be encoded (on the network side) using fountain codes. The encoding may add few bits to the original bit string or stream, for example resulting in a total of 1010 encoded bits. The bits are then sent to a UE in a plurality of packets, where each packet includes a portion of the encode bits. When the UE receives all the encoded bits (in the different packets), the UE can decode the bits to retrieve the original 1000 bits.

A Hybrid ARQ (or HARQ) scheme can also be used for reducing communication errors, e.g., due to lost packets or other errors. The HARQ scheme includes using forward error correction (FEC) codes in transmission to enable the receiving UE to determine whether a packet was received correctly (e.g., without error). The FEC codes in each packet may include redundancy bits. The UE can use the FEC code in a packet to determine errors per packet. The HARQ scheme also includes sending an acknowledgement (ACK) message from the UE back to the network when a packet is received with error. Thus, the network resends that packet.

The fountain codes can be applied in a UE-to-UE relay based system (e.g., the system 100) or a UE group based relay system (e.g., the system 200) at a higher layer that the MAC sub-layer. For example, the higher layer may be an application layer, a transport layer, or a network layer above the data link layer. Specifically, the fountain codes are applied at the base station or network at a layer higher than the MAC sub-layer and subsequently decoded at the destination or target UE. However, the fountain codes at the higher layer are transparent to the relay UE, which relays the packets and implements the HARQ scheme at the MAC sub-layer.

Since a relay UE in the UE-to-UE relay based system (e.g., the UE-A in system 100) is not a dedicated relay, packet loss can happen, for example due to HARQ residual error or the UE leaving a group of joint UE reception. For instance, when a relay UE 220 leaves a UE group 240, a packet sent or received by that relay UE 220 can be lost if the relay UE 220 sends back a HARQ ACK but does not send it to the destination UE 220 in the same UE group 240. Applying fountain codes in the higher layer can prevent such losses and provide better UE quality of experience. Specifically, a base station 210 continues to send packets with fountain codes for a bit stream or data block until the base station 210 receives a corresponding ACK message from the destination UE 220 at the higher layer to indicate complete reception and decoding of that bit stream or data block. The base station 210 then stops the transmission or retransmission of the data packets for that bit stream or data block. Using the fountain codes as such at the higher layer (above the MAC sub-layer) relaxes the requirement of successful detection and relaying of each individual packet and enables autonomous loose UE cooperation, which allows more flexibility in the UE-to-UE relay scheme. As such, UEs can join and leave a UE group at any time without substantially reducing user experience due to packet losses and in a manner transparent to the base station or network.

Combining the fountain codes at the higher layer with the HARQ scheme at the MAC sub-layer allows for joint optimization. Typically, the higher the code rate at the physical layer, the lower the necessary code rate is at the higher layer, and vice-versa, to meet signal to noise level requirements. This trade-off between the physical layer and the higher layer applicable rates allows the joint optimization of FEC and fountain code rates at the two layers to improve capacity. As described above, upon decoding the packets successfully at the UE at the higher layer, an ACK message is sent back to the network, which reduces the need for HARQ retransmissions and communications at the MAC sub-layer.

Figure 3:
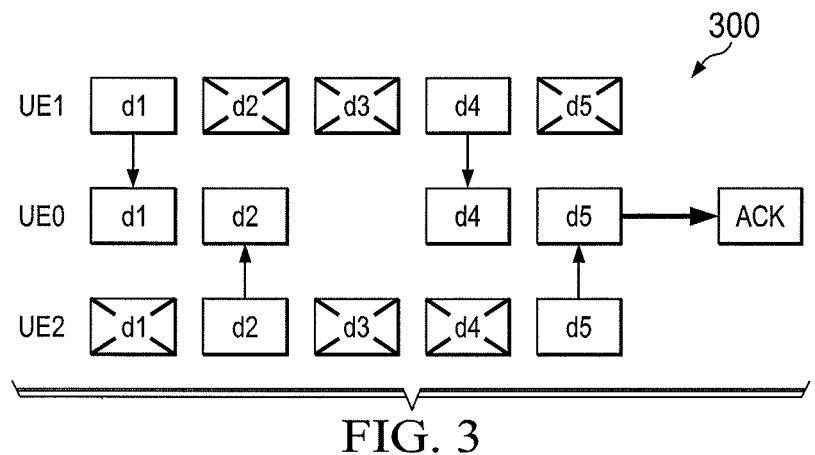
FIG. 3 illustrates an embodiment of a UE relay based scheme.

FIG. 3 shows an embodiment of a UE relay based scheme 300 using joint optimization of the higher layer fountain codes and the MAC sub-layer HARQ scheme. The scheme 300 involves a plurality of UEs, including helping UE1 and UE2 that serve as relays to a target UE0. The target UE0 is intended to receive a plurality of portions of an encoded data block or bit string, which may be relayed by UE1 and/or UE2 from a base station (not shown) to UE0. The portions of the data block are encoded at the base station using fountain codes and then transmitted to relay UE1/UE2 in multiple packets. For example, the encoded data block is partitioned into 4 portions and transmitted in a plurality of packets including d1 to d5. In turn, the relay UE1/UE2 forward the packets to UE0, which needs to collect the 4 portions to decode the entire data block or bit string. The fountain codes in the relayed packets are transparent to the relay UE1/UE2. For example, if UE0 successfully receives d1 and d4 from UE1 and successfully receives d2 and d5 from UE2 but packet d3 is lost in the relay process, then UE0 can still obtain the 4 needed portions to decode the entire data block or bit string. After successfully decoding the data, UE0 sends back an ACK message at the higher layer to the base station.

With respect to data packets d1 to d5, each one of UE1 and UE2 that has successfully received the packet can send an MAC sub-layer ACK to the base station. If more than one UE have correctly received the packet, then each may send a MAC sub-layer ACK independently from the other. UE relaying can be selective combining based, which means that the UE with the best relay channel is selected to relay the packet. This implementation requires coordination among the UEs. Alternatively, the same packet can be forwarded simultaneously by all the relaying UEs (e.g., at the same time). This second implementation may be less efficient than the selective combining approach in terms of energy efficiency and interference generation but does not require coordination between the UEs.

UE0, UE1, and UE2 are part of the same UE group which can be formed on a UE-centric basis (by association between the UEs). Any UE included in the group of UE0 may be selected for relay based on having a sufficiently good access link and a sufficiently good relay link, e.g. according to signal and error conditions. The term "good" may be relative to UE0's own access link (direct link with a base station). UE0 can have UE1 in its group, but UE1 may not necessarily have UE0 in its group, for instance because the chance for UE1 to get help from UE0 can be low. In addition, the size of a UE relay group can be predefined. For example, a group size that is substantially large may be inefficient, and a size that is too small may be unreliable.

In scenarios, the HARQ scheme can be more effective for the first about three retransmissions. Additional retransmissions can be less effective, for instance in terms of both coding gain and energy accumulation/interference diversity. Typically, HARQ is designed for scenarios where no higher layer FEC codes are used, such as in long term evolution (LTE) systems. Further, typical TCP/IP protocols are designed to handle relatively low packet rates, e.g., in relatively high speed TCP-based file downloads that require loss rates on the order of $10^{-5}$ to $10^{-6}$. As such, the HARQ scheme on a MAC sub-layer may be needed to correct a plurality or the majority of transmission errors. However, by applying fountain codes in UE-to-UE relay at a higher layer, the required HARQ performance can be substantially relaxed and user experience can also be significantly improved. Specifically, the number of HARQ retransmissions can be limited to about 1 to 3 retransmissions, leaving the higher layer fountain codes to handle any additional errors or losses. This is referred to herein as joint optimization of the higher layer fountain codes and the MAC sub-layer HARQ codes and transmissions.

Figure 4:
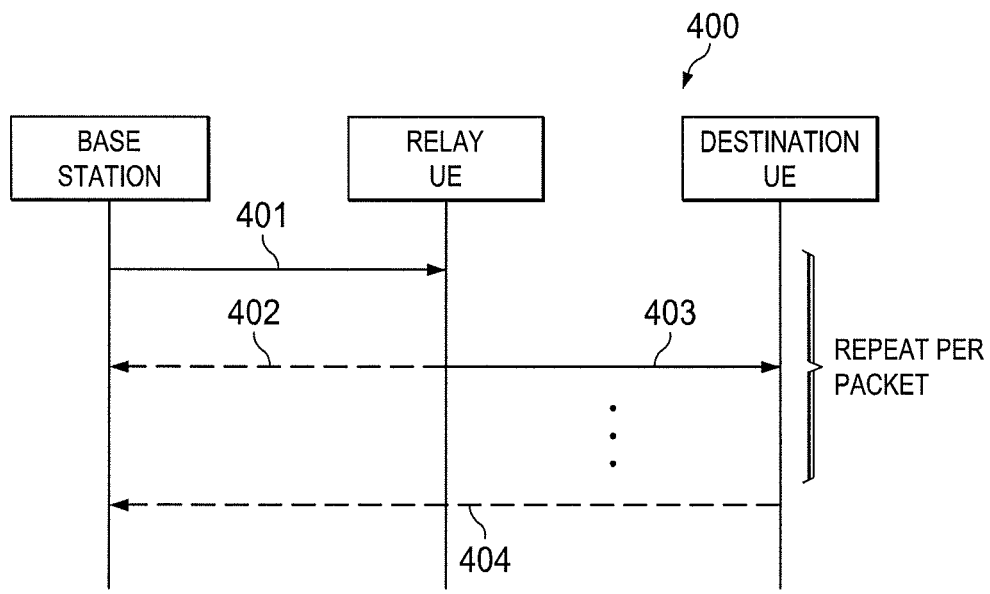
FIG. 4 illustrates an embodiment method for UE based relay.

FIG. 4 is a protocol diagram that shows an embodiment method 400 for UE based relay with higher layer fountain codes and MAC sub-layer HARQ with FEC codes. The method 400 is implemented by a base station, a relay UE, and a destination UE. The relay UE and the destination UE are part of a UE group for joint reception, e.g., as described in system 200. At step 401, the base station sends a packet intended for the destination UE to the UE group. The packet includes a portion of original data encoded with fountain codes at an application layer or any other layer higher than the MAC sub-layer. At step 402, upon receiving the packet by a relay UE in the UE group, the relay UE returns a MAC sub-layer ACK message to the base station. If the relay UE does not receive the packet, the ACK message is not sent and the base station retransmits the same packet (until receiving the ACK or a maximum number of retransmissions is reached). At step 403, the relay UE forwards the packet to the destination UE, which belongs to the same UE group as the relay UE. Alternatively, if the destination UE receives the packet directly from the base station, then the destination UE sends the MAC sub-layer ACK message to the base station.

The steps 401 to 403 are repeated for each packet sent from the base station and relayed by the relay UE to the destination UE. The destination UE collects the data portions in each received packet at the higher layer. At step 404, upon receiving enough number of packets at the destination UE, the destination UE starts to decode the fountain coded data. Once the original data is successfully decoded, the destination UE returns a higher layer ACK message to the base station. Hence, the base station stops sending the packets for that data. Otherwise, the base station keeps transmitting the next fountain coded packet, until a higher layer ACK is received or a predefined transmission time is reached. Thus, the method 400 can reduce HARQ retransmissions.

Figure 5:
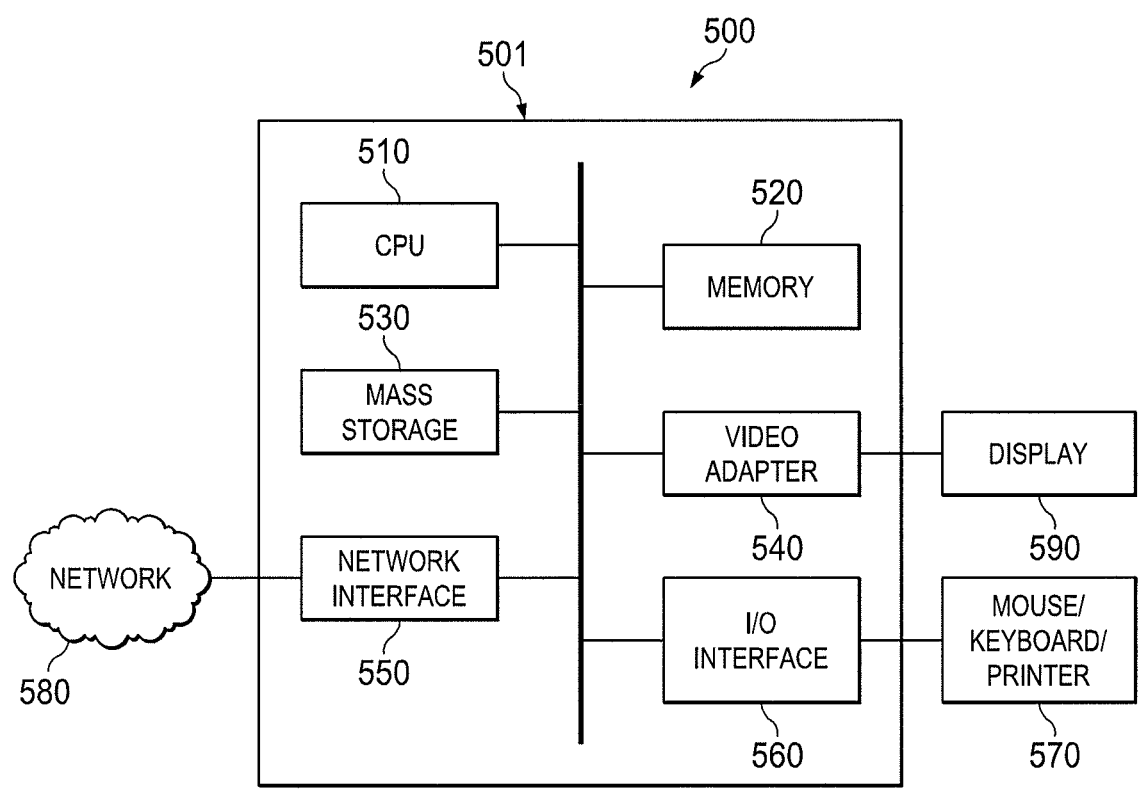
FIG. 5 is a block diagram of a processing system that can be used to implement various embodiments.

FIG. 5 is a block diagram of a processing system 500 that can be used to implement various embodiments. Specific devices or UEs may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, a memory 520, a mass storage device 530, a video adapter 540, and an I/O interface 560 connected to a bus. The bus may be one or more of any type of several bus architectures including a memory bus or memory controller, a peripheral bus, a video bus, or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The video adapter 540 and the I/O interface 560 provide interfaces to couple external input and output devices to the processing unit. As illustrated, examples of input and output devices include a display 590 coupled to the video adapter 540 and any combination of mouse/keyboard/printer 570 coupled to the I/O interface 560. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, the method comprising:
receiving, by a helping user equipment (UE) from a base station of a wireless network, a first data packet intended for a target UE, the first data packet including a portion of data, the data comprising a plurality of data packets including the first data packet, the first data packet encoded with a code at or below a media access control (MAC) layer, and the data encoded with a rateless code at a higher network layer than the MAC layer, the rateless code at the higher network layer being transparent to the helping UE;
decoding, by the helping UE, the first data packet with the code at or below the MAC layer without decoding the data encoded with the rateless code at the higher network layer;
transmitting, from the helping UE to the base station, a hybrid automatic repeat request (HARQ) acknowledgment (ACK) message at the MAC layer based on the decoding at or below the MAC layer without decoding the data encoded with the rateless code at the higher network layer; and
forwarding, from the helping UE to the target UE, the decoded first data packet only if the helping UE successfully decodes the first data packet at or below the MAC layer without decoding the data encoded with the rateless code at the higher network layer,
wherein the HARQ ACK message at the MAC layer stops HARQ retransmission of the first data packet from the base station, and an ACK message at the higher network layer stops HARQ retransmissions of the plurality of data packets from the base station.

2. The method of claim 1, wherein the code at or below the MAC layer is a HARQ forward error correction (FEC) code at a network physical (PHY) layer.

3. The method of claim 1, wherein the helping UE and the target UE are associated with a UE group for joint reception, and the helping UE in the UE group is transparent to the base station.

4. A method, the method comprising:
receiving, by a target user equipment (UE) from a base station of a wireless network, a first data packet forwarded via a helping UE, the first data packet including a portion of data, the data comprising a plurality of data packets including the first data packet, the first data packet encoded with a code at or below a media access control (MAC) layer, and the data encoded with a rateless code at a higher network layer than the MAC layer, the rateless code at the higher network layer being transparent to the helping UE, wherein the first data packet is received via the helping UE only if the helping UE successfully decodes the first data packet at or below the MAC layer without decoding the data encoded with the rateless code at the higher network layer, wherein the helping UE transmits a hybrid automatic repeat request (HARQ) acknowledgment (ACK) message at the MAC layer to the base station based on decoding of the first data packet at or below the MAC layer;
decoding, by the target UE, the data at the higher network layer; and
transmitting, by the target UE to the base station, an ACK message at the higher network layer upon receiving an entirety of the data, wherein different portions of the data are received in different packets from one or more helping UEs in a UE group for joint reception associated with the target UE, wherein the HARQ ACK message at the MAC layer stops HARQ retransmission of the first data packet from the base station, and the ACK message at the higher network layer stops HARQ retransmissions of the plurality of data packets from the base station.

5. The method of claim 4, wherein the rateless code is transparent to the one or more helping UEs.

6. The method of claim 4, further comprising:
transmitting, by the target UE to the base station, another HARQ ACK message at the MAC layer upon directly receiving the first data packet from the base station, and wherein the code at or below the MAC layer is a HARQ forward error correction (FEC) code.

7. A method, the method comprising:
encoding, by a base station, data intended for a target user equipment (UE) using a rateless code at a higher network layer than a media access control (MAC) layer, the data comprising a plurality of data packets encoded with a code at or below the MAC layer;
transmitting, by the base station, the plurality of data packets to a UE group for joint reception, the UE group comprising the target UE and one or more helping UEs;
receiving, by the base station, a hybrid automatic repeat request (HARQ) acknowledgment (ACK) message at the MAC layer for each of the plurality of data packets from the one or more helping UEs in the UE group that receive and forward the plurality of data packets to the target UE based on decoding of the each of the plurality of data packets with the code at or below the MAC layer without decoding the data encoded with the rateless code at the higher network layer, wherein the one or more helping UEs forward the plurality of data packets to the target UE only if the one or more helping UEs successfully decode the plurality of data packets at or below the MAC layer without decoding the data encoded with the rateless code at the higher network layer; and
receiving, by the base station from the target UE, an ACK message at the higher network layer to indicate that the encoded data is received successfully,
wherein the HARQ ACK message at the MAC layer stops HARQ retransmission of a corresponding data packet of the plurality of data packets from the base station, and the ACK message at the higher network layer stops HARQ retransmissions of the plurality of data packets from the base station.

8. The method of claim 7, wherein the rateless code uses fountain code.

9. The method of claim 7, further comprising:
retransmitting, by the base station, up to a determined maximum number of retransmissions, each of the plurality of data packets until the HARQ ACK message at the MAC layer is received from the UE group for each of the plurality of data packets.

10. A helping user equipment (UE), comprising:
at least one processor; and
a computer readable storage medium storing programming for execution by the at least one processor, the programming including instructions when executed by the at least one processor to:
receive, from a base station of a wireless network, a first data packet intended for a target UE, the first data packet including a portion of data, the data comprising a plurality of data packets including the first data packet, the first data packet encoded with a code at or below a media access control (MAC) layer, and the data encoded with a rateless code at a higher network layer than the MAC layer, the rateless code at the higher network layer being transparent to the helping UE;
decode the first data packet with the code at or below the MAC layer without decoding the data encoded with the rateless code at the higher network layer;
transmit, to the base station, a hybrid automatic repeat request (HARQ) acknowledgment (ACK) message at the MAC layer based on the decoding at or below the MAC layer without decoding the data encoded with the rateless code at the higher network layer; and
forward, to the target UE, the decoded first data packet only if the helping UE successfully decodes the first data packet at or below the MAC layer without decoding the data encoded with the rateless code at the higher network layer,
wherein the HARQ ACK message at the MAC layer stops HARQ retransmission of a corresponding data packet of the plurality of data packets from the base station, and an ACK message at the higher network layer stops HARQ retransmissions of the plurality of data packets from the base station.

11. The helping UE of claim 10, wherein the code at or below the MAC layer is a HARQ forward error correction (FEC) code at a network physical (PHY) layer.

12. The helping UE of claim 10, wherein the helping UE and the target UE are associated with a UE group for joint reception, and the helping UE in the UE group is transparent to the base station.

13. A target user equipment (UE), comprising:
at least one processor; and
a computer readable storage medium storing programming for execution by the at least one processor, the programming including instructions when executed by the at least one processor to:
receive, from a base station of a wireless network, a first data packet forwarded via a helping UE, the first data packet including a portion of data, the data comprising a plurality of data packets including the first data packet, the first data packet encoded with a code at or below a media access control (MAC) layer, and the data encoded with a rateless code at a higher network layer than the MAC layer, the rateless code at the higher network layer being transparent to the helping UE, wherein the first data packet is received via the helping UE only if the helping UE successfully decodes the first data packet at or below the MAC layer without decoding the data encoded with the rateless code at the higher network layer, wherein the helping UE transmits a hybrid automatic repeat request (HARQ) acknowledgment (ACK) message at the MAC layer to the base station based on decoding of the first data packet at or below the MAC layer;
decode the data at the higher network layer; and
transmit, to the base station, an ACK message at the higher network layer upon receiving an entirety of the data, wherein different portions of the data are received in different packets from one or more helping UEs in a UE group for joint reception associated with the target UE, wherein the HARQ ACK message at the MAC layer stops HARQ retransmission of a corresponding data packet of the plurality of data packets from the base station, and the ACK message at the higher network layer stops HARQ retransmissions of the plurality of data packets from the base station.

14. The target UE of claim 13, wherein the rateless code is transparent to the one or more helping UEs.

15. The target UE of claim 13, the programming further including instructions when executed by the at least one processor to:
transmit, to the base station, another HARQ ACK message at the MAC layer upon directly receiving the first data packet from the base station, and wherein the first data packet comprises a HARQ forward error correction (FEC) code.

16. A base station, comprising:
at least one processor; and
a computer readable storage medium storing programming for execution by the at least one processor, the programming including instructions when executed by the at least one processor to:
encode data intended for a target user equipment (UE) using a rateless code at a higher network layer than a media access control (MAC) layer, the data comprising a plurality of data packets encoded with a code at or below the MAC layer;
transmit the plurality of data packets to a UE group for joint reception, the UE group comprising the target UE and one or more helping UEs;
receive a hybrid automatic repeat request (HARQ) acknowledgment (ACK) message at the MAC layer for each of the plurality of data packets from the one or more helping UEs in the UE group that receive and forward the plurality of data packets to the target UE based on decoding of the each of the plurality of data packets with the code at or below the MAC layer without decoding the data encoded with the rateless code at the higher network layer, wherein the one or more helping UEs forward the plurality of data packets to the target UE only if the one or more helping UEs successfully decode the plurality of data packets at or below the MAC layer with the rateless code at the higher network layer being transparent to the one or more helping UEs without decoding the data encoded with the rateless code at the higher network layer; and
receive, from the target UE, an ACK message at the higher network layer to indicate that the encoded data is received successfully,
wherein the HARQ ACK message at the MAC layer stops HARQ retransmission of a corresponding data packet of the plurality of data packets from the base station, and the ACK message at the higher network layer stops HARQ retransmissions of the plurality of data packets from the base station.

17. The base station of claim 16, the rateless code uses fountain code.

18. The base station of claim 16, the programming further including instructions when executed by the at least one processor to:
retransmit, up to a determined maximum number of retransmissions, each of the plurality of data packets until the HARQ ACK message at the MAC layer is received from the UE group for each of the plurality of data packets.

\* \* \* \* \*